March 15, 1927.  
W. H. GREEN  
1,620,886  
APPARATUS FOR REGENERATION OF ZEOLITES AND THE LIKE  
Filed July 17, 1922
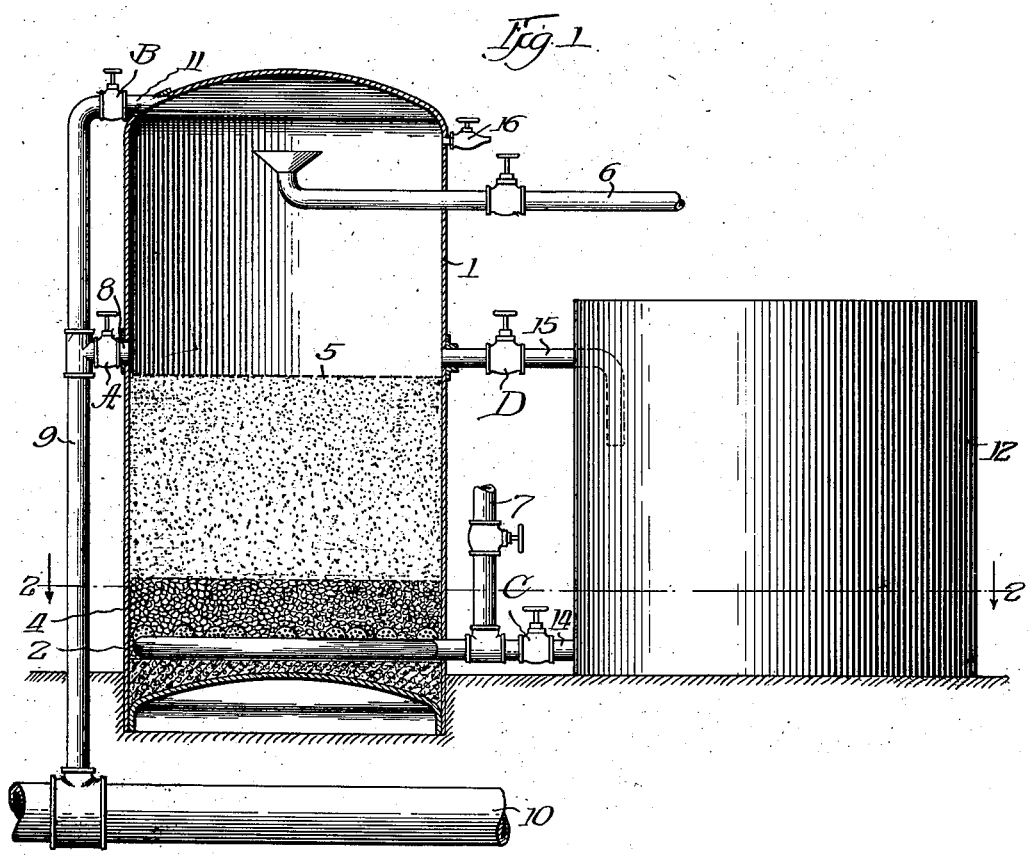
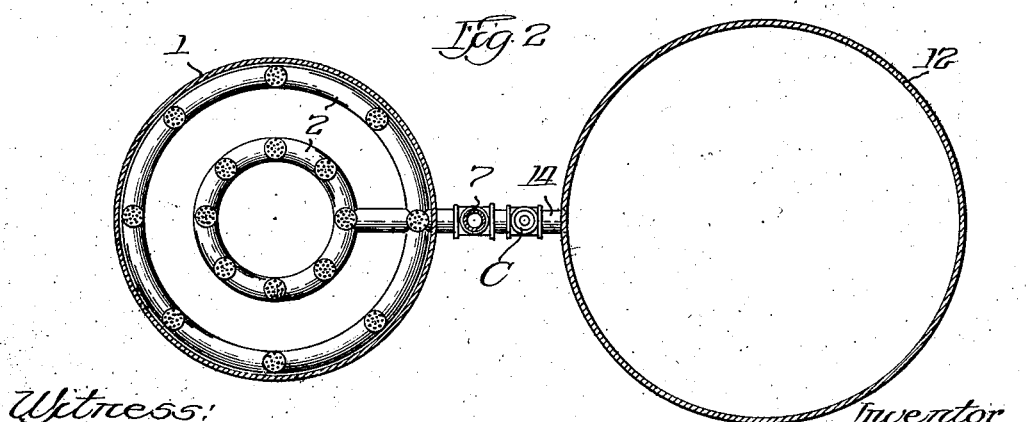

Patented Mar. 15, 1927.

1,620,886

UNITED STATES PATENT OFFICE.

WALTER H. GREEN, OF CHICAGO, ILLINOIS, ASSIGNOR, BY MESNE ASSIGNMENTS, TO GENERAL ZEOLITE COMPANY, OF CHICAGO, ILLINOIS, A CORPORATION OF ILLINOIS.

APPARATUS FOR REGENERATION OF ZEOLITES AND THE LIKE.

Application filed July 17, 1922. Serial No. 575,663.

This invention relates generally to apparatus for treatment of liquids, and particularly to apparatus designed for the treatment of water by base exchange materials for the purpose of removing elements which render the water hard.

The general object of this invention is the provision of apparatus designed for the handling of large quantities of liquid, such as are handled in the commercial or industrial treatment of water, and whereby the operations for the regeneration of the base exchange material may be accomplished rapidly and at low cost.

Another object of the invention is the provision of such an apparatus whereby a portion of the unexhausted regenerating solution may be recovered, and a portion of the wash water recovered, both to be employed for the preparation of more regenerating solution.

Other and further objects of the invention will be pointed out hereinafter, indicated in the appended claims or obvious to one skilled in the art from the present disclosure.

For the purpose of the present application I will describe one manner in which the invention may be embodied and practiced, and will illustrate the same diagrammatically, but it is to be understood that this disclosure is here presented for illustrative purposes only, and that it is not to be construed in any fashion such as to limit the invention which I purport to secure, short of its true and most comprehensive scope in the art.

In the drawing forming a part of this specification, Fig. 1 is a diagrammatic representation of a sectional elevation of a form of apparatus in which the invention may be embodied, and Fig. 2 is a transverse sectional view taken along the line 2—2 of Fig. 1.

Described generally, the invention contemplates the inclusion of a water softening apparatus, sometimes referred to as a zeolite filter or softener, the characteristic feature of which is that it contains a bed of base exchange material with suitable conduit connections for passing raw water through the same, whereby the base exchange material is rendered effective upon the water to extract the hardening elements therefrom, substituting in their stead elements which are not objectionable in the contemplated employment of the water. In association with this softener I employ a tank for regenerating solution, it being contemplated that the same shall act as a receptacle for a proper quantity of solution containing elements, which, on its passage through the base exchange material in the softener, will be taken up by the base exchange material in exchange for so-called hardening elements which the material has previously taken from the raw water. This regenerating tank is connected with the softener by suitable conduits in such fashion that regenerating solution will be discharged into the softener in such relationship that it may pass upwardly through the bed of base exchange material. Above the bed of base exchange material is a discharge connection through which liquid may be discharged into a conduit arranged in such fashion as to constitute the long or discharge leg of a siphon, the action of which will be effective to draw regenerating solution from the tank through the bed of base exchange material and then effect its discharge into the sewer. Above this discharge connection is a second discharge connection also leading to the siphon leg referred to, through which second connection liquid may be siphoned out of the upper portion of the softener casing to induce flow of regenerating solution through the bed of base exchange material and into the portion of the softener casing thereabove. From this upper portion of the casing a return connection is arranged through which liquid in that portion of the softener casing may be discharged into the regenerating tank, where it may be employed in the preparation of new regenerating solution.

The invention may be understood more in detail by reference to the accompanying drawing in which it will be observed the numeral 1 designates the casing of a softener, which is closed against entrance of air, and in the bottom of which is arranged a strainer header 2 having orifices distributed over the area of the casing. Above the strainer header is disposed a layer 4 of gravel or other suitable material pervious to liquid and adapted to afford a proper foundation for a bed of base exchange material 5. The latter is formed of granular material so that it affords a pervious treating bed through which the liquid to be treated may percolate. It is contemplated that the material of this treating bed possesses base-exchange characteristics, as, for example, having the capacity for exchanging sodium or potassium for magnesium and calcium, and vice versa. Consequently, after a quantity of water containing magnesium or calcium has been passed through the bed of treating material, it will have taken up an amount of these elements. In order to restore its effectiveness it must then be regenerated by treatment with a solution containing sodium or potassium, its content of calcium and magnesium being exchanged and going into the liquid of the treating solution, which liquid must then be flushed out of the container so as to remove it from contact with the water to be treated and the treating material. This is ordinary practice in the use of base exchange materials.

Above the surface of the bed of treating material the casing 1 affords a closed receptacle into which the water to be treated may be introduced through an inlet conduit 6, the water being discharged above the bed of treating material so that it may percolate therethrough and be withdrawn through the strainer header 2 and discharged to a point of use or storage through the soft water conduit 7. At a point slightly above the surface of the bed of treating material the casing is arranged to afford an outlet 8, discharge through which is controlled by a valve A. The outlet 8 leads to a discharge conduit 9 which extends downwardly to a waste conduit 10. In its upper portion, above the outlet 8, the casing has communication with a second outlet pipe 11, flow through which pipe is controlled by a valve B, and which pipe has communication with the discharge conduit 9. Associated with the softener is an open tank 12 adapted for retention of the regenerating solution. This tank preferably is placed so that its bottom is above the lower end of the discharge conduit 9, and it is connected by a pipe 14 with the strainer header 2, discharge of solution from the tank 12 through the pipe 14 being controlled by a valve C. Further communication between the casing 1 and the tank 12 is afforded by return pipe 15 which has communication with the casing 1 at a point slightly above the surface of the bed 5. Flow through the pipe 15 is controlled by the valve D. Introduction of air into the casing is controlled by a vent cock 16.

The operation of the apparatus described is as follows:

In the water softening operation, raw water is discharged into the casing 1 from the inlet pipe 6, filling the casing. It passes through the zeolite bed 5, where the exchange of sodium or potassium for magnesium or calcium is effected, and the water thus softened finds outlet through the strainer header 2, and the soft water pipe 7. This process having been carried on until the softening effect of the treating material has been depreciated to a point rendering it no longer efficient, communication through pipe 7 is closed. This leaves the casing 1 full of water. Then, to accomplish the regeneration of the treating material, the valve A is first opened so that water flows out through pipe 9, whereupon the valve C is opened, thus establishing communication between the regenerating tank 12, and the discharge pipe 9 through the casing 1. Then the valve in pipe 6 is closed to shut off supply of raw water. The arrangement affords a siphon with the discharge conduit 9 forming the discharge leg. The effect of this is to cause regenerating solution to flow from the tank 12 through the pipe 14 and strainer header 2 and up through the bed 5. In the course of its passage through the bed the regenerating solution effects the exchange of its sodium or potassium content for calcium and magnesium held by the base exchange material. After passage through the bed 5, this solution, now containing calcium and magnesium, flows by the siphonic action out through the outlet 8 and into the discharge conduit 9 whence it is discharged to the sewer. Due to the high magnesium and calcium content of the treating material at the beginning of the regenerating operation, the regenerating solution first passed through it will have substantially its entire potassium or sodium content abstracted, and it will carry away the calcium and magnesium given in return. After the treating material has been subjected to a certain amount of the regenerating solution, however, it will be found that the latter still contains a considerable portion of its original potassium or sodium, and a relatively small proportion of calcium and magnesium. While it may not be desirable to terminate the regenerating operation at this point, it is desirable in many instances to conserve this only slightly exhausted regenerating solution. This is accomplished in the present apparatus by closing the valve A and opening the valve B. Inasmuch as the operation has maintained the upper portion of the casing 1 full of water, which by this time is more or less contaminated with the calcium-carrying solution, the opening of valve B will establish the siphonic course from the tank 12 through the casing 1 and the outlet 11. This will draw the water out of the upper portion of the casing and result in a continuation of the flow of regenerating solution from the tank 12 upwardly through the bed 5 and into the upper portion of the casing 1, where it displaces the water drawn off through the outlet 11. This continued treatment of the bed 5 with the regenerating solution will be effective to complete the exchange of the remaining small amount of calcium and magnesium in the bed for a certain portion of the potassium or sodium of the regenerating solution. However the quantity of solution thus passed through the bed after the valve A has been closed will be held in the upper portion of the casing 1. After a sufficient amount of the regenerating solution has thus been allowed to enter the softener, the valves B and C are closed and the valve D opened. This establishes communication between the casing 1 and the tank 12, so that upon opening of the vent cock 16 the solution held in the tank 1 will flow back into the tank 12.

Following this operation it is desirable to back-wash the bed 5 in order to remove any of the regenerating solution remaining therein. This is accomplished by opening communication with the pipe 7 and introducing water into the bottom of the casing 1 through the header 2, while the valve D is still open. This will result in the back-washing of the bed 5 with water, which will carry the remaining regenerating solution out of the bed so that it will be discharged from the casing 1 through the pipe 15 into the tank 12. The unexhausted regenerating solution and the water thus returned to the tank 12 may then be utilized for the preparation of a new batch of regenerating solution therein. The softener thus having been regenerated and washed, the valve D is closed, and the apparatus is again in condition for treatment of raw water, the vent cock 16 being closed when the casing 1 has become filled with raw water introduced through the inlet pipe 6.

From the foregoing it will be observed that this apparatus affords a simply operated and convenient means whereby the regenerating operation may be rapidly accomplished, and a substantial portion of the regenerating solution, which may be suitable for re-use, recovered incident to the operation. By the employment of the siphon arrangement illustrated the operation may be effected without the expenditure of mechanical power although, if desired, a pump may be utilized to effect the discharge from the casing through the discharge pipe 9, or to effect the return of regenerating solution from the casing to the regenerating tank.

I claim:

1. In apparatus of the class described, in combination with a treating device comprising a casing and a pervious bed of treating material therein, a tank for regenerating solution having outlet communication with the casing below the bed of treating material, a discharge conduit having communication with the casing at a point adjacent the surface of the bed of treating material and at a point adjacent the top of the casing, a return conduit to the tank for draining the portion of the casing above the bed and valves for controlling communication between the tank and the casing and the discharge conduit and the casing.

2. In apparatus of the class described, in combination, a closed casing adapted for retention of a bed of treating material, a discharge conduit having communication with said casing adjacent its upper portion and adjacent the upper surface of the bed of treating material, a tank for regenerating solution having communication with the casing both below and above the bed of treating material, means for controlling such communications, and means for supplying liquid into the casing below the bed of treating material, said discharge conduit terminating at a level permitting it and the casing to function as a siphon to draw liquid from the tank.

3. In apparatus of the class described, in combination, a closed casing having a bed of treating material partially filling the same, the balance of the casing affording a liquid receiving chamber above said bed, a tank associated with said casing and having communication therewith below said bed, a discharge conduit having communication with said chamber adjacent the lower and upper limits thereof, a conduit for discharging liquid from the receiving chamber into the tank, and means for controlling the communications between said casing, tank, and discharge conduit.

4. In apparatus of the class described, in combination, a casing having a bed of treating material partially filling the same, the balance of the casing affording a liquid receiving chamber, a regenerating tank having communication with the casing for the introduction of liquid into the casing below the bed and for the withdrawal of liquid from the casing above the bed, and a discharge conduit affording a siphon leg having communication with the casing adjacent the upper and lower limits of the liquid receiving chamber.

5. In apparatus of the class described, in combination, a casing having a bed of granular treating material partially filling the same, the balance of the casing affording a liquid receiving chamber above the bed, means arranged to effect withdrawal of liquid at the upper portion of said chamber, a tank for reception of regenerating liquid, a conduit for introducing liquid from said tank into the casing below the bed of treating material, and a conduit arranged to conduct liquid from the liquid receiving chamber to the tank.

6. In apparatus of the class described, in combination, a casing, a bed of treating material partially filling the same, the portion of said casing above said bed affording a liquid receiving chamber, connections arranged to permit withdrawal of liquid at the upper and lower portions of said chamber, a tank for regenerating liquid, means for introducing liquid from the tank into the casing below the bed, and means for conducting liquid from said chamber to the tank.

7. Apparatus of the class described, comprising the combination of a closed casing having a bed of treating material partially filling the same, said casing affording a liquid receiving chamber above the bed, a tank for regenerating liquid, a conduit for introducing liquid from said tank into the casing below the bed, a conduit arranged to conduct liquid from the liquid receiving chamber to the tank, means for introducing wash water into the casing below the bed, a siphon member communicating with the upper portion of the liquid receiving chamber and extending downwardly therefrom, and means for controlling communication through said conduits and said siphon member.

8. Apparatus of the class described, comprising in combination, a siphon device, including a casing and a discharge conduit communicating with the upper portion thereof and extending downwardly to constitute a discharge leg, together with a pervious bed of treating material disposed in the lower portion of the casing, means for introducing wash water below the bed, a tank for regenerating liquid, conduits affording communication between the tank and the casing above and below the bed, and means for controlling communication through the several conduits.

In testimony whereof I have hereunto subscribed my name.

WALTER H. GREEN.